United States Patent [19]

Stiegler

[11] Patent Number: 5,056,202

[45] Date of Patent: Oct. 15, 1991

[54] APPARATUS FOR MAKING AND TRANSPORTING STACKS OF FOIL SECTIONS

[76] Inventor: Karl H. Stiegler, Mohlstr. 1, D-7000 Stuttgart 1, Fed. Rep. of Germany

[21] Appl. No.: 417,552

[22] Filed: Oct. 5, 1989

[30] Foreign Application Priority Data

Oct. 7, 1988 [DE] Fed. Rep. of Germany ....... 3834115

[51] Int. Cl.[5] ........................ B23Q 5/00; B65G 61/00

[52] U.S. Cl. .................................. 29/33 P; 198/692; 493/204

[58] Field of Search .................... 29/33 R, 33 K, 33 P; 198/610, 613, 692, 803.11; 493/204, 227; 271/195

[56] References Cited

U.S. PATENT DOCUMENTS

| | | | |
|---|---|---|---|
| 3,555,977 | 1/1971 | Saumsiegle | 493/393 |
| 4,252,233 | 2/1981 | Joice | 355/298 |
| 4,371,365 | 2/1983 | Shingo | 198/692 X |
| 4,547,111 | 10/1985 | Achelpohl | 198/802 X |
| 4,668,158 | 5/1987 | Sample et al. | 414/27 |
| 4,735,602 | 4/1988 | Debin | 493/204 |
| 4,758,214 | 7/1988 | Debin | 493/372 X |

FOREIGN PATENT DOCUMENTS

| | | |
|---|---|---|
| 2332925 | 1/1974 | Fed. Rep. of Germany . |
| 3138221 | 6/1982 | Fed. Rep. of Germany . |
| 8128146 | 10/1982 | Fed. Rep. of Germany . |

*Primary Examiner*—William Briggs

*Attorney, Agent, or Firm*—Wigman & Cohen

[57] ABSTRACT

The invention relates, in particular, to the field of plastic bag treatment.

The method consists in releasably connecting brackets 29 for holding together stacks 15 to a stack conveying device 21, stacking the individual bags 11 on the legs 31 of the brackets 29 in a stacking station 14 and then taking off the stacks 15 held together by the brackets 29 in a take-off station 22.

The apparatus comprises the stack conveying device 21 to which the brackets 29 are connected by a releasable holding device in such a way that each stack 15 can be taken together with the bracket 29 off the stack conveying device in the take-off station 22. The brackets 29 are fed to the stack conveying device 21 in a bracket delivery station 70 preceding the stacking station 14. The legs 31 of the brackets 29 then serve in the stacking station 14 as wicketing pins on which the individual bags 11 are stacked.

20 Claims, 9 Drawing Sheets

APPARATUS FOR MAKING AND TRANSPORTING STACKS OF FOIL SECTIONS

BACKGROUND OF THE INVENTION

1. Field of the Invention

The invention relates to apparatus for making and transporting stacks of foil sections, in particular, plastic bags, comprising a stack conveying device for step-wise conveyance of the foil sections stacked on wicketing pins on the stacking conveying device.

2. Description of the Related Art

Apparatus of this kind are known, for example, from German Offenlegungsschrift (published patent application) 2,332,925, German Utility Model 8,128,146, German Patent 3,138,221 and U.S. Pat. Nos. 4,252,233 and 3,555,977, wherein both individual pins and, as disclosed in U.S. Pat. No. 3,555,977, the legs of U-shaped brackets are used as wicketing pins.

From, for example, German Utility Model 8,128,146 and U.S. Pat. No. 4,252,233, it is known to provide in this apparatus:

a stacking station; a row of interconnected transport members; a pair of wicketing pins on each transport member for placing the foil sections thereon in the stacking station, thereby to form the stacks; a drive for driving in a step-wise manner the row of transport members, thereby to form a stack conveying device; and a take-off station for taking the stacks off the stack conveying device.

In the known apparatus of this kind which have been implemented in practice, the stacks are taken off the stack conveying device by hand in the take-off station. The object of German Offenlegungsschrift (published patent application) 3,026,494 is to enable fully automatic operation by using a rotary-table-like stack conveying device.

SUMMARY OF THE INVENTION

The object underlying the invention is to enable fully automatic removal of the stacks from the stack conveying device.

The inventor has recognized that in order to accomplish this object, a new method must first be devised for achieving the object in question.

The invention is based on the known method wherein the transported stacks are placed on the legs of U-shaped brackets.

The inventive method comprises the steps of (a) releasably connecting the brackets to the stack conveying device such that their legs form wicketing pins for stacking the sections, (b) placing the sections one on top of the other on the legs of the brackets to form the stacks, and (c) taking the thus formed stacks together with the brackets off the stack conveying device.

Owing to the fact that the wicketing pins on the stack conveying device are formed by the legs of releasable brackets, the stack only has to be taken off the stack conveying device together with the bracket in accordance with feature (c) in the take-off station. Therefore, transferral of the stack from the wicketing pins to the legs of U-shaped brackets is no longer required, which is the main difficulty in taking the stacks off the conveyor path in the known apparatus.

The invention also consists in providing apparatus exhibiting the features mentioned at the beginning with which the inventive method is easy to carry out.

The inventive apparatus is characterized in that (a) a bracket of U-shaped bent configuration is provided to form each pair of wicketing pins, (b) each transport member comprises a releasable holding device for a bracket to hold the bracket in a stacking position in which the legs of the bracket form the wicketing pins, (c) a bracket delivery station in which the brackets are fed by a delivery device to the transport members and gripped there by the holding devices is provided beside the stack conveying device, and (d) a releasing device for releasing the holding device is provided in the take-off station.

What is accomplished by the invention in a surprisingly simple manner and with simple structural means is that the stack of bags which has been driven into the take-off station does not have to be taken off the wicketing pins and placed on a bracket. In accordance with the invention, the brackets which, so far, have also been used for storing the stacks, can be fed to the stack conveying device in the bracket delivery station and held there in the stacking position by the holding device. The holding device can be easily released by the releasing device provided in the take-off station and the stack held together by the bracket taken off. This take-off operation is simplified to such a considerable extent in the apparatus according to the invention for both removal by hand and automatic removal that the taking-off can be carried out in an extremely short time. This is not only advantageous for the taking-off operation, but owing to the fact that substantially shorter times are required for the taking-off, the output of, for example, a machine for manufacturing plastic bags can also be considerably increased because the bags made by it can be stacked very quickly and taken away in stacked form.

The invention also enables further simplification of the take-off operation by a slip-on station for slipping stack securing discs onto the legs of the brackets being provided between the stacking station and the take-off station beside the stack conveying device, for owing to the fact that the stack is taken off the stack conveying device together with the wicketing pins formed by the legs of the clamped brackets, securing discs can be slipped on before the stack is taken off the stack conveying device.

In an advantageous embodiment of the invention, provision is made for (a) the transport members to be articulatedly connected to one another to form a row revolving endlessly in a vertical plane, (b) the bracket delivery station to be associated with the bottom lane of this row, and (c) the bracket delivery station to comprise a saddle for at least one bracket for feeding the bracket in the bracket delivery station to the holding device in the transport member.

Since the brackets rest with the crosspiece on the saddle and the legs hanging down, particularly easy handling of the brackets during delivery to the stack conveying device is achieved. A special advantage is to be seen in the fact that the saddle can be designed as a shaping part which cooperates with pull bars and a holding-down device to bend a bracket from a piece of wire.

To form this piece of wire, the end of a wire can be drawn off a supply roll via the saddle, cut off the wire and bent into a U-shaped bracket by the pull bars and the holding-down device.

BRIEF DESCRIPTION OF THE DRAWINGS

The invention is explained in detail in the following description of two embodiments of apparatus for making stacks of plastic bags illustrated highly schematically in the appended drawings in which.

DETAILED DESCRIPTION OF THE PREFERRED EMBODIMENTS

Figures 1, 1A, 2:
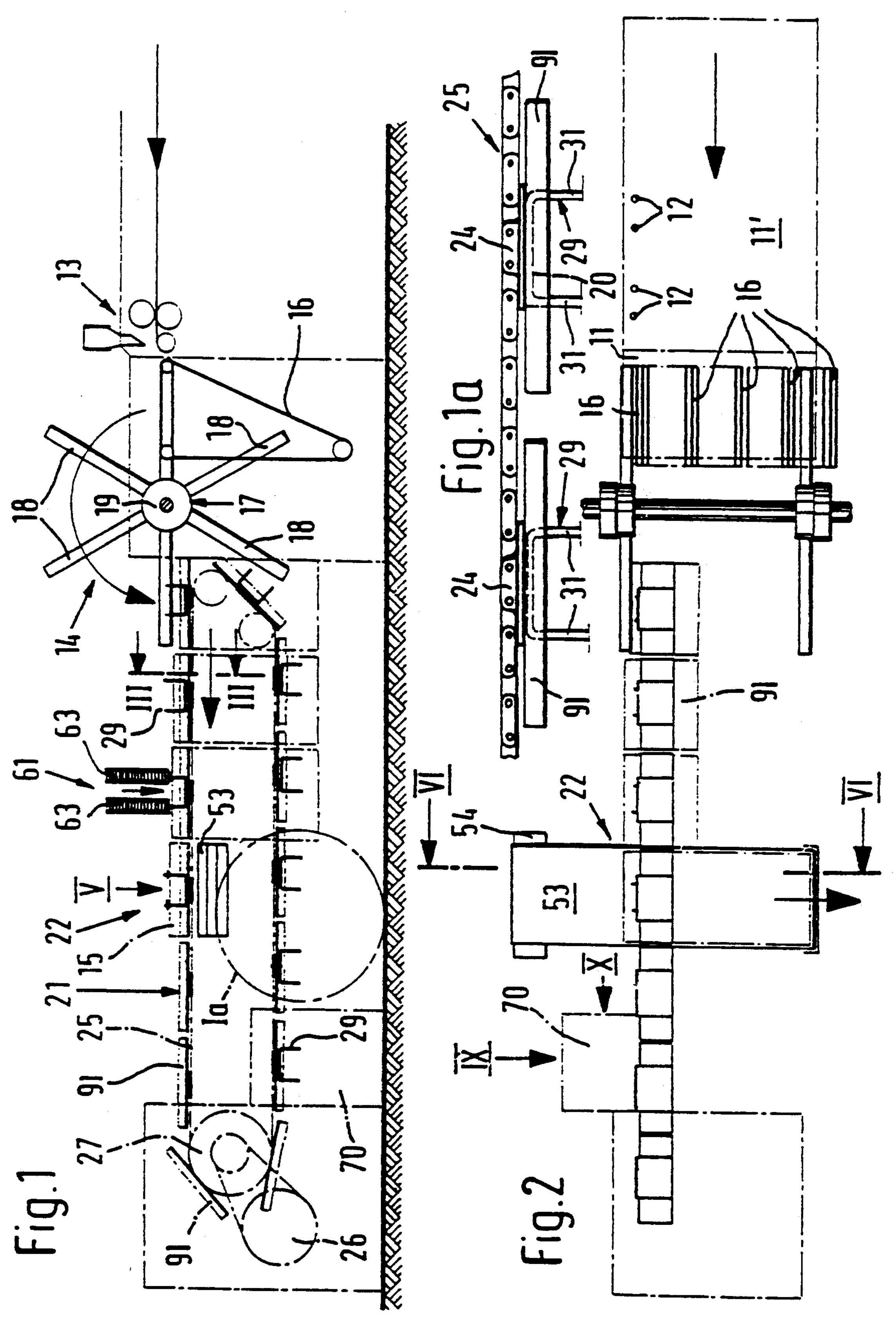
FIGS. 1 and 2 are a side and a plan view of the first embodiment.
FIG. 1*a* is a detail Ia from FIG. 1 showing two transport members joined by a chain.

The first embodiment shown in FIGS. 1 to 10 of an inventive apparatus for making and transporting stacks of plastic bags 11 having stack holes 12 (FIG. 2) at the edge of their opening comprises the following stations:

a welding station 13 in which the bags 11 (FIG. 2) are manufactured by making welding seams in a plastic web 11' and severing the bags from the latter;

a stacking station 14 in which the bags are stacked in stacks of bags 15; and a take-off station 22 in which the stacks 15 are taken off a stack conveying device 21 while it is at a standstill.

A bag conveying device 16 feeds the single bags 11 severed in the welding station one after the other to the stacking station 14 and supports them therein.

A bladed wheel 17 in the stacking station 14 has blades which are formed by at least two suction arms 18 each which extend radially from the bladed wheel hub 19. While the bladed wheel 17 rotates, the suction arms 18 lift the bags 11 fed by the bag conveying device 16 one after the other off the latter. The stack conveying device 21 takes the stacks of bags 15 stacked in the stacking station 14 away in a stepwise manner.

The stack conveying device 21 comprises carrier plates 23 which are connected in spaced relation to one another to one link 24 each (see FIG. 1*a*) of an endless roller chain 25 which is driven step-wise by a drive motor 26 via a drive wheel 27. Each carrier plate 23 carries a releasable holding device, illustrated in greater detail in FIGS. 3, 4 and 5, underneath a sheet metal cover 30. The holding device comprises a U-shaped bracket 29 with two legs 31 and a crosspiece 20 joining them, maintains releasably but firmly a stacking position in which the two legs 31 rest against abutment surfaces 95 formed by the right-hand end face of the carrier plate 23 in FIG. 3 and hence extend upwards as wicketing pins so that the bags fed from above by the bladed wheel can be stacked onto these legs 31 as wicketing pins in the stacking station.

Figure 3:
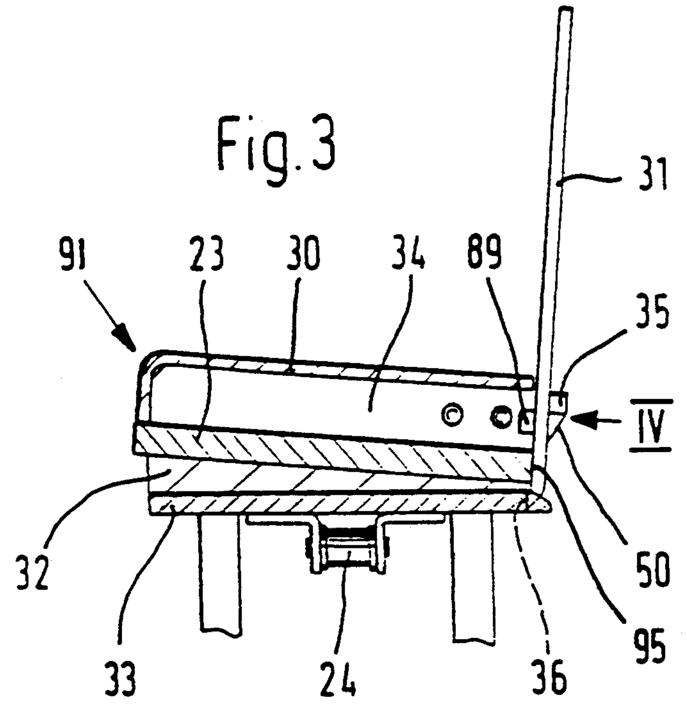
FIG. 3 is a section along line III—III in FIGS. 1 and 5, wherein the stack according to FIG. 1 is omitted.
Figure 4:
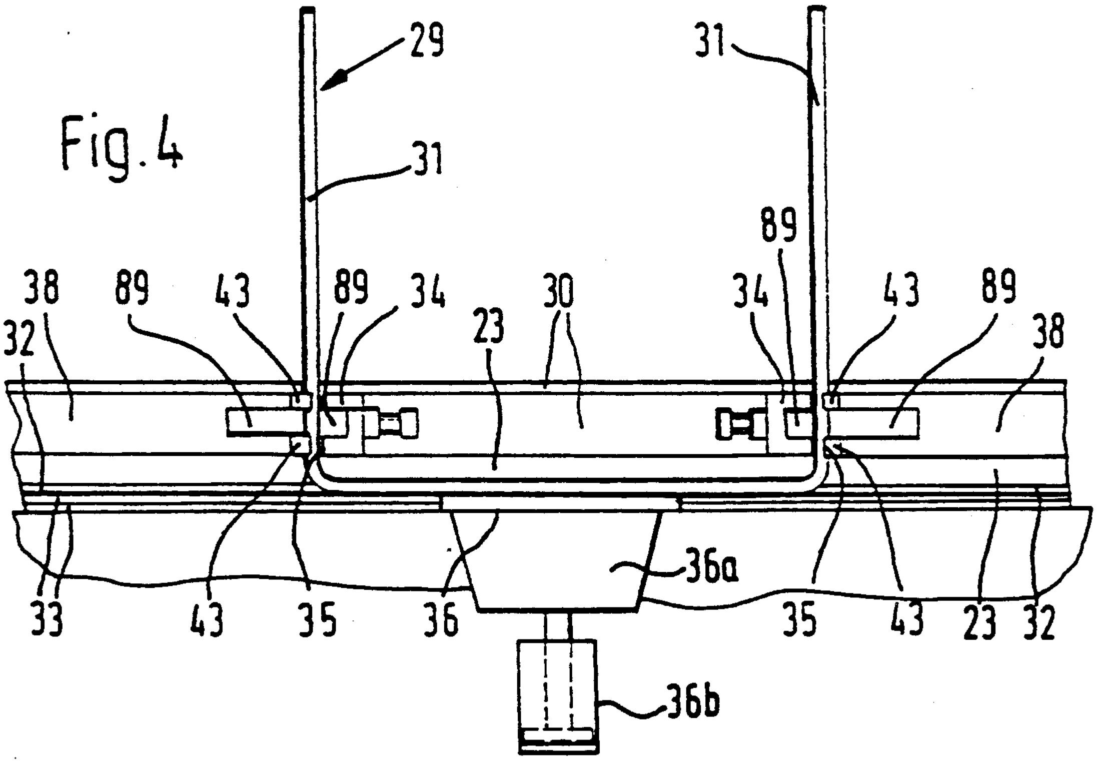
FIG. 4 is a view in the direction of arrow IV in FIG. 3.
Figure 5:
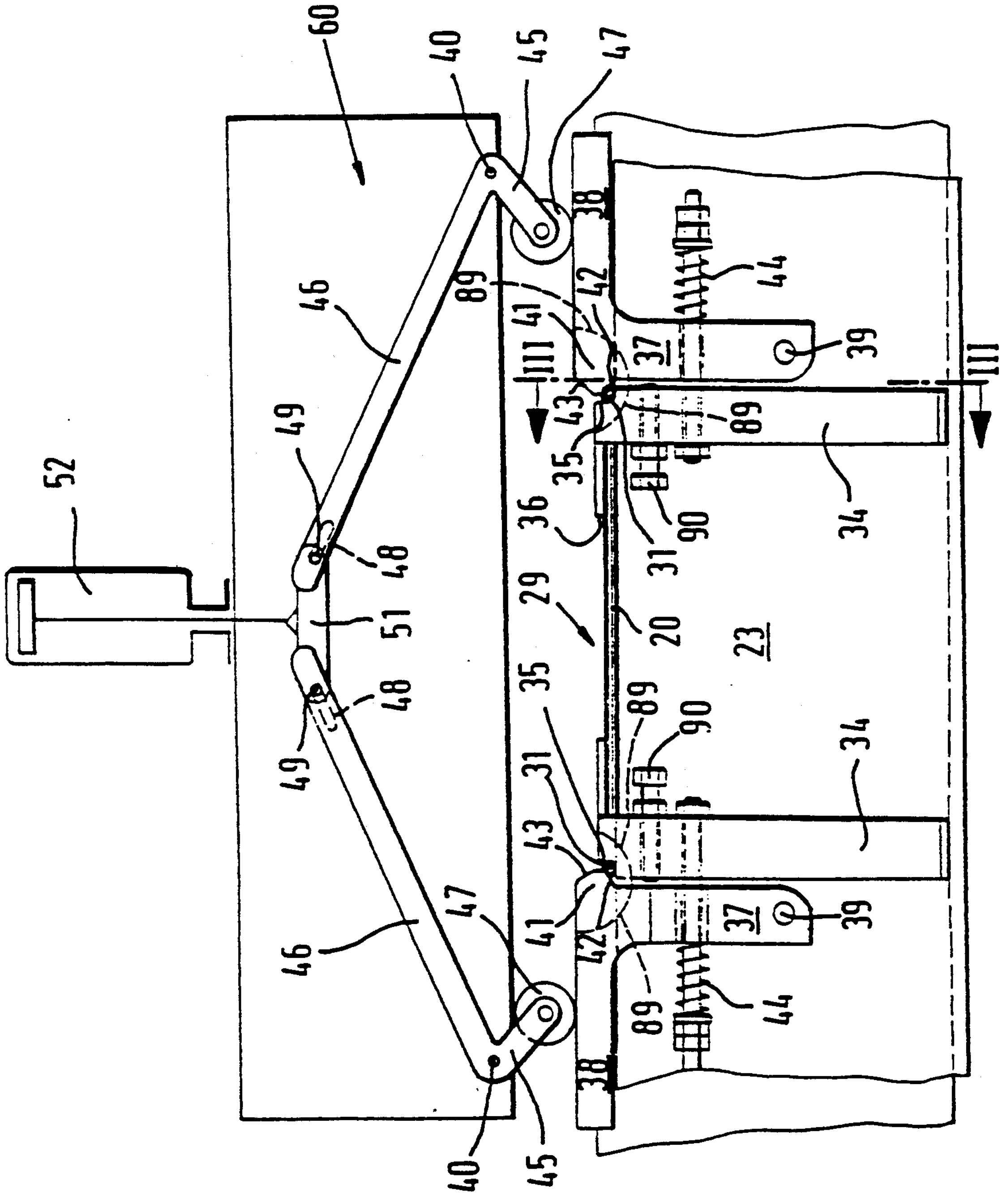
FIG. 5 is a plan view of the take-off station in the direction of arrow V in FIG. 1.
Figure 8:
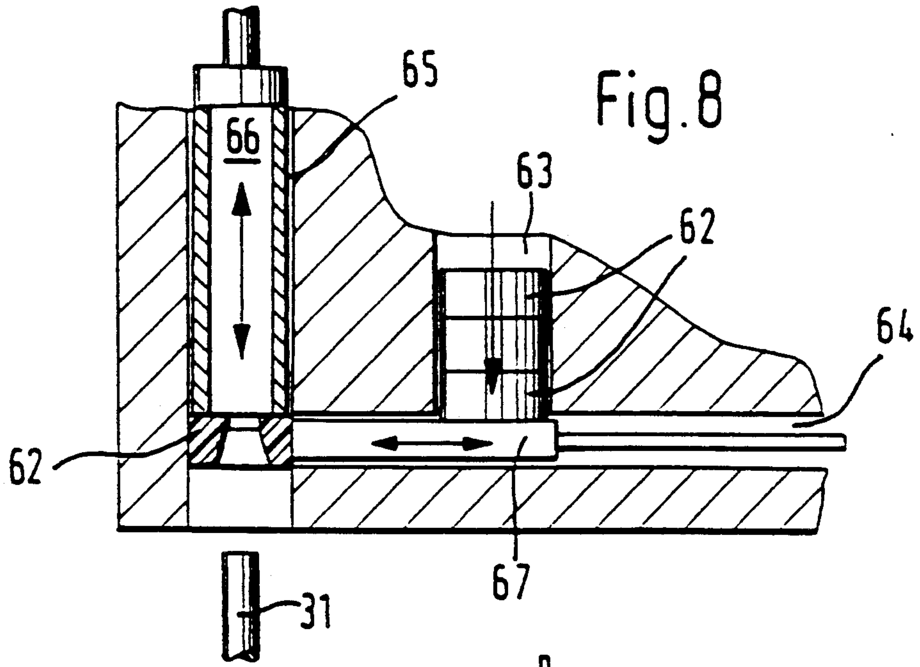
FIG. 8 is a section through the device for slipping stack securing discs onto the wicketing pins.
Figure 6:
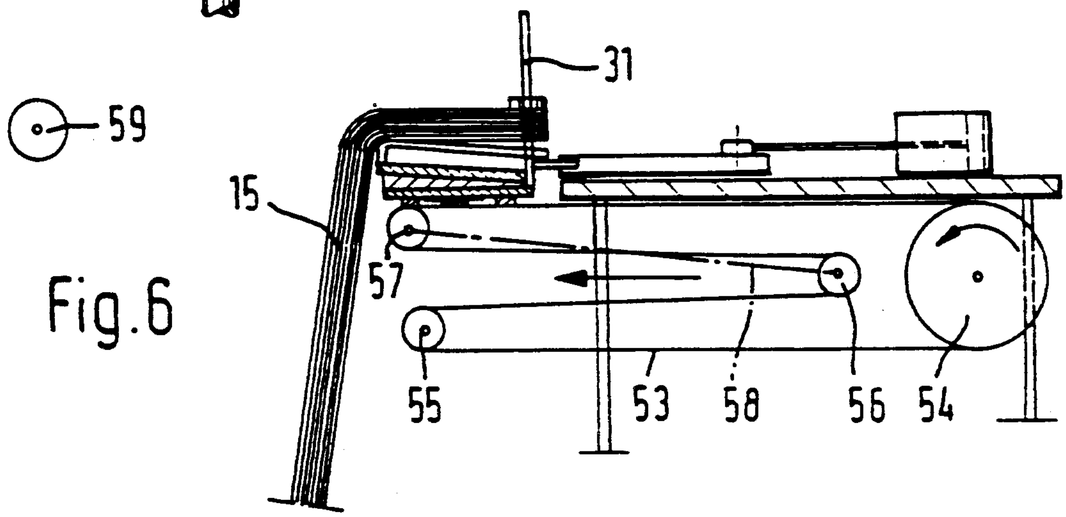
FIGS. 6 and 7 are sections of the take-off station along line VI—VI in FIG. 2, wherein the lifting device for the downwardly hanging stack end is illustrated in its retracted and extended position, respectively.

A holding device, illustrated in FIGS. 3, 4 and 5, is arranged on each carrier plate 23 of the stack conveying device 21, and a releasing device for releasing the holding device in the take-off station 22 is shown in FIG. 5.

As illustrated, in particular, in FIG. 3, the carrier plate 23 is arranged via a wedge-shaped spacer 32 on a base plate 33 which lies horizontally in the upper and lower lanes of the stack conveying device and is directly connected to the chain link 24 of the roller chain 25. The carrier plate 23 with the sheet metal cover 30, the spacer 32 and the base plate 33 with the chain link 24 form a transport member 91 of the stack conveying device 21.

Attached to the carrier plate 23 (see FIG. 5) are two bars 34 whose top outer corners in FIG. 5 form clamping jaw surfaces 35 for abutment of the facing sides of the legs 31 of a bracket 29 whose crosspiece 20 extends below these bars 34 and, as shown in FIGS. 3 and 4, rests on the outer rim of the base plate 33 which has a recess 36 for engagement of an ejector 36*a* which is movable up and down by a lifting cylinder 36*b* in order to lift the crosspiece 20 of the bracket 29 above the sheet metal cover 30.

To form a releasable holding device for the brackets 29, angle levers with arms 37 and 38 are arranged as clamping members in each transport member 91 on the carrier plate 23 on the sides of the bars 34 that face away from one another. In the position illustrated in FIG. 5, the arms 37 extend parallel to the bars 34 and are connected at their ends to the carrier plate 23 for pivotal motion about axes 39. At the crown 41, the angle levers 37, 38 form clamping surfaces 42 cooperating with the clamping jaw surfaces 35 as well as insert surfaces 43. The arms 37 of the two angle levers are pressed by springs 44 in the direction towards the bars 34. The insert surfaces 43 of the two angle levers diverge on the side facing away from the carrier plate 23 and are arranged such that when the legs 31 of a bracket 29 are brought up to the carrier plate 23 from above in FIG. 5, the arms 37 of the two angle levers 37, 38 are pressed apart. A space between the clamping jaw surfaces 35 and clamping surfaces 42 for receiving the legs 31 is thereby opened and the legs 31 are clamped therein by the force of the springs 44. In order that the legs 31 of the bracket 29 are held in a precisely defined, fixed position in this receiving space between the clamping jaw surfaces 35 and the clamping surfaces 42, the clamping surfaces 42 of the two angle levers converge towards the side facing away from the carrier plate 23 so that they close the receiving space for the legs 31 in the outward direction when the angle levers 37, 38 can be moved by the action of the springs 44. The wedge-shaped spacer 32 serves to give the legs the inclination to the vertical shown in FIG. 3, which, as is known, is necessary so as not to impede the rotation of the bladed wheel 17 during the stacking of bags.

In order that the movability of the angle levers 37, 38 is not impeded by the stacks of bags speared onto the legs 31 of the bracket 39 and that a smooth base is provided for the stack of bags, the space receiving the angle levers 37, 38 and bars 34 above the carrier plate is covered by the sheet metal cover 30.

The take-off station 22 is located on the top lane of the stack conveying device and comprises a releasing device designated in its entirety 60 in FIG. 5. The releasing device serves to release the bracket 29 of the stack located in the take-off station from the clamping by the clamping device formed by the bars 34 and the angle levers 37, 38. For this purpose, the releasing device 60 comprises two angle levers formed by arms 45 and 46 and mounted at their crowns for rotation about axes 40. Rollers 47 are provided at the ends of the arms 45 as actuating members for cooperation with the arms 38 of the angle levers 37, 38. Pins 49 of a connecting link guide 51 attached to the end of a piston rod of a lifting cylinder 52 engage elongate holes 48 at the ends of the arms 46. The arrangement is such that when the piston rod of the lifting cylinder 52 is extended, the angle levers 45, 46 are pivoted about their axes 40 such that the rollers 47 engage as actuating members the arms 38 of the angle levers 37, 38 and pivot the arms 37 about their axes 39 away from the bars 34 so that the spaces receiving the legs 31 of the bracket 29 open in the outward direction. The stack in the take-off station can then be removed from the clamping device by simply pulling the stack. As shown, in particular, in FIGS. 3 and 4, the crosspiece of the bracket 29 in the take-off station 22 is located at a distance beneath the stack so that when the stack is pulled, the bracket is placed somewhat at an incline and is thereby easily pulled out of the clamping device. The end faces 50 (FIG. 3) of the bars 34 are designed such that the bracket 29 slides without difficulty out of the clamping device when the two angle levers 37, 38 are in their open position.

The take-off station 22 comprises beneath the releasing device a lifting device for the free end of the stack 15 hanging down from the stack conveying device 21.

The lifting device has a drivable conveyor belt 53 which is oriented horizontally and transversely to the conveying direction of the stack conveying device 21. A drive roll 54 driven about its fixed axis serves to drive this conveyor belt 53. Three deflection rolls 55, 56 and 57 are provided for deflecting the conveyor belt 53. The top deflection rolls 56 and 57 are mounted on a slider 58 indicated only schematically as a dot-and-dash line in FIGS. 6 and 7 which is movable back and forth, while the deflection roll 55 like the drive roll 54 is mounted on a fixed axis. The slider 58 can be moved out of the retracted initial position illustrated in FIG. 6 below the stack conveying device 21 into the extended position illustrated in FIG. 7 in which the conveyor belt has lifted the part of the stack hanging down from the stack conveying device.

Figure 7:
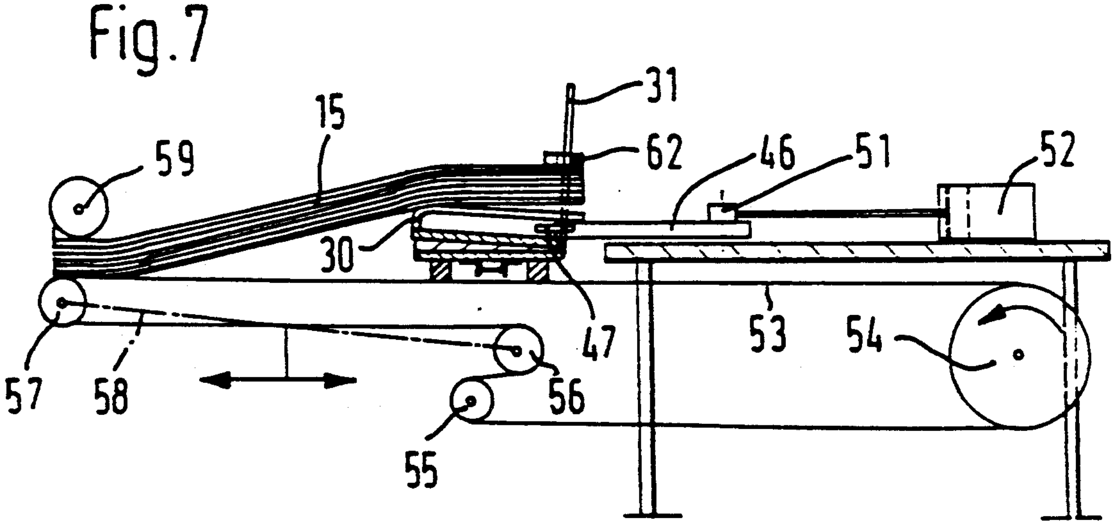
Figure 9:
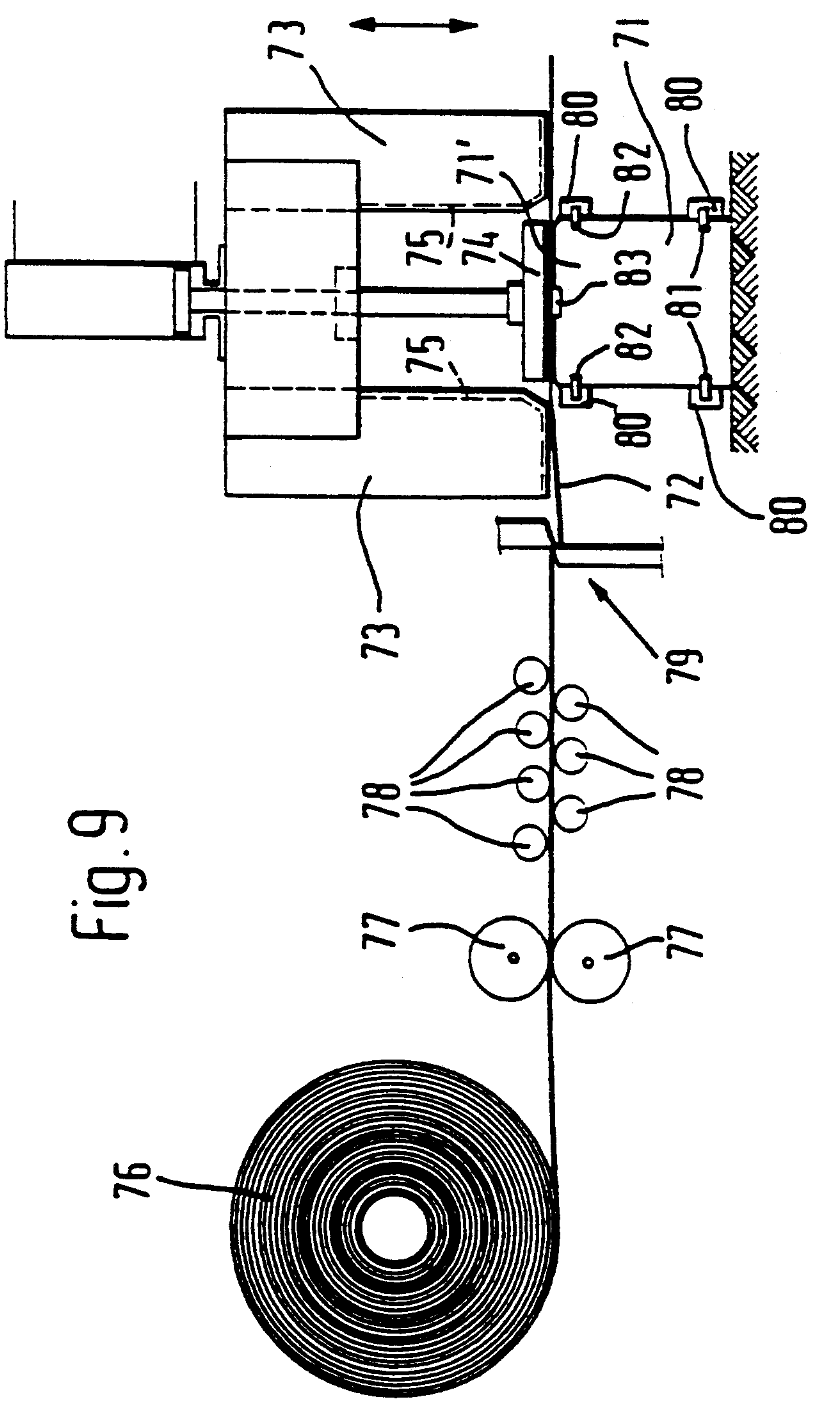
FIGS. 9 and 10 are a simplified view in the direction of arrow IX and a side view in the direction of arrow X in FIG. 2 of the bracket delivery station.

After the ejector 36a has raised the crosspiece 20 of the bracket above the sheet metal cover 30, the stack 15 is removed from the stack conveying device 21 by the conveyor belt 53 moved by the drive roll 54 driven in the direction of the arrow in FIG. 7 with the cooperation of a take-off roll 59 which is mounted for rotation about a fixed axis and is contacted by the stack 15 when the latter is lifted. The conveyor belt 53 then conveys the stack 15 held together by the bracket 29 to a further conveyor which is not illustrated in the drawings.

A slip-on station 61 is arranged on the upper lane of the stack conveying device 21 between the stacking station 14 and the take-off station 22. The slip-on station 61 comprises a slip-on device illustrated in detail in FIG. 8 for slipping stack securing discs 62 onto the free ends of the legs 31 of the brackets 29 after they have left the stacking station, in order that the stack remains intact when conveyed away from the take-off station 22 and the bags do not slide off the bracket 29. This slip-on device comprises two (FIG. 1) substantially vertical storage chutes 63 containing a supply of stack securing discs 62 lying one on top of the other. Each storage chute 63 opens into a horizontal feed channel 64 on the bottom of which the column of stack securing discs 62 is supported so that the bottom disc 62 is entirely within the feed channel 64. Each feed channel opens, in turn, into a disc ejector chute 65 which is aligned in accordance with a leg 31 of the bracket 29 located in the slip-on station for a securing disc to be placed thereon. A thrust tube 66 is driven by a lifting cylinder, not illustrated, for upward and downward motion in the disc ejector chute 65. A plunger 67 is driven by a lifting cylinder, likewise not illustrated, for reciprocating motion in the feed channel 64. In its retracted position, the plunger 67 assumes a position in which it exposes the space below the storage chute 63 so that the column of securing discs 62 in the storage chute 63 moves downwards by virtue of its weight until the bottom securing disc lies on the bottom of the feed channel 64. During the conveying stroke of the stack conveying device, the plunger 67 pushes the securing disc located in the feed channel 64 into the ejector chute 65 in which, at this point in time, the thrust tube 66 is in its retracted position above the feed channel 64. Once a stack coming from the stacking station comes to rest below the slip-on device which is aligned such that the two ejector chutes 65 are located coaxially above the two legs 31 of a bracket 29, the thrust tubes 66 move down and push the securing discs 62 located below them onto the legs of the bracket 29 located thereunder.

A bracket delivery station 70 is associated with the bottom lane of the stack conveying device 21 between the take-off station 22 and the stacking station 14. In FIGS. 1 and 2, the bracket delivery station 70 is merely indicated by rectangles drawn in dot-and-dash lines. A shaping part 71 for shaping a bracket 29 from a piece of wire 72 is indicated schematically in FIGS. 9 and 10. For this purpose, two pull bars 73 and a holding-down device 74 are provided for cooperation with the shaping part 71. The pull bars comprise grooves 75 for the piece of wire 72. A corresponding groove is also provided in the holding-down device 74. A supply roll 76 is provided for delivery of a piece of wire 72. A length of wire corresponding to the length of the piece of wire 72 is drawn off the supply roll 76 by a pair of draw-off rolls 77 during the conveying step of the stack conveying device and aligned by alignment rolls 78 and fed to a knife 79 which after termination of the drawing-off operation cuts the piece of wire 72 off the end of the wire drawn off the supply roll 76 after the front end of the drawn-off wire has been held in place on the shaping part 71 by downward motion of the holding-down device 74. The pull bars 73 are then moved downwards so that the ends of the piece of wire 72 protruding on either side of the shaping part 71 are bent into legs 31 of a wire bracket 29 for which the top portion of the shaping part 71 forms a saddle 71'.

In order to feed the bracket 29 thus shaped on the shaping part 71 to the clamping device on the carrier plate 23, two feed bars 81 and 82 are provided on each side of the shaping part 71 and a feed bar 83 on the top side of the shaping part, these being guided in guides 80 and in grooves of the shaping part 71.

Figure 10:
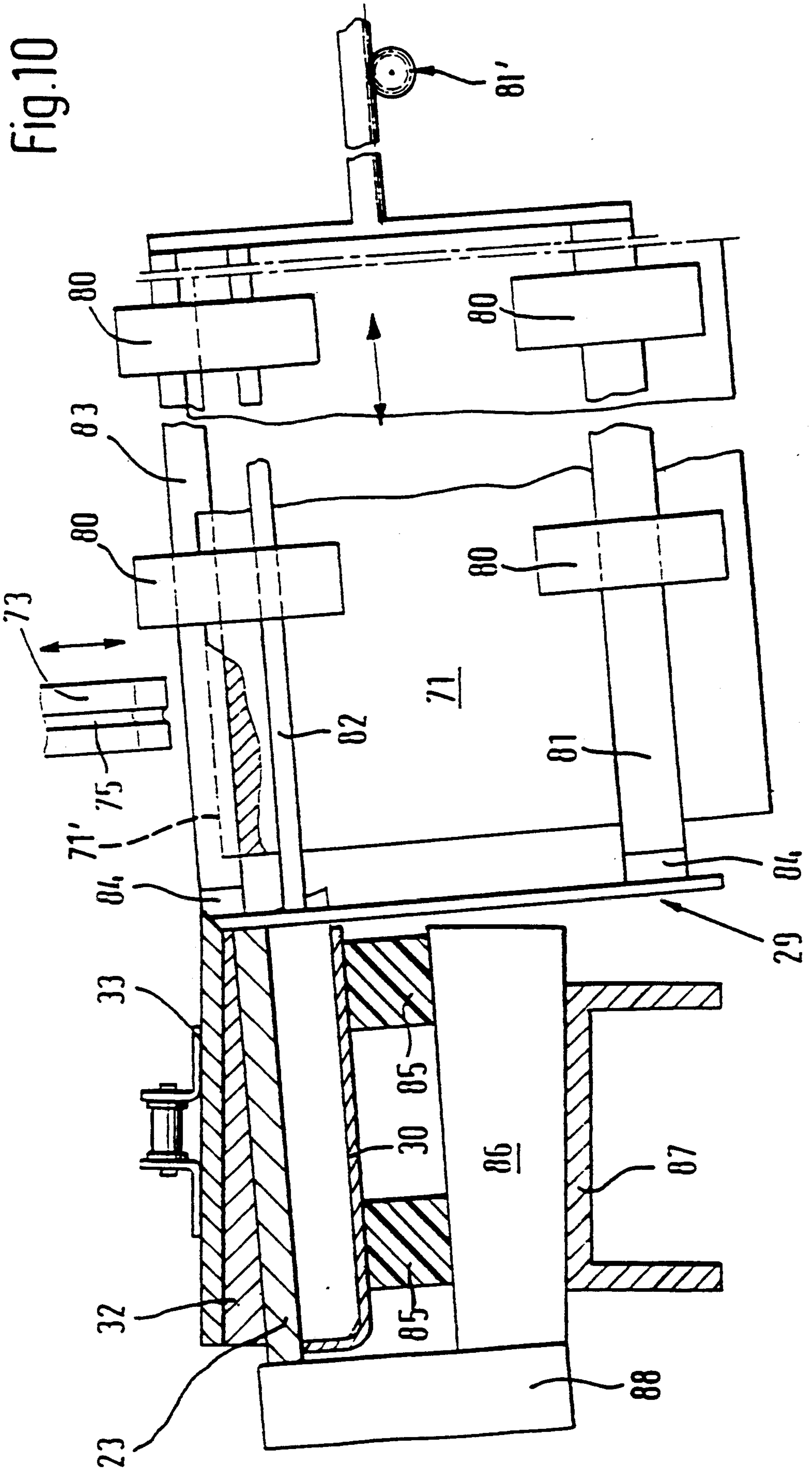

All five feed bars 81, 82 and 83 are driven by a common drive, illustrated schematically as a rack-and-pinion drive 81' in FIG. 10. As shown in FIG. 10, the shaping part 71 is slightly inclined so that its top side forms a surface which is slightly inclined towards the stack conveying device with respect to the horizontal. The feed bars 81, 82 and 83 are guided parallel to this surface of the shaping part 71.

The feed bars 81 and 83 are provided with magnets 84 at their front ends. When the feed bars 81, 82 and 83 are pushed forward, the magnets 84 are pushed against the bracket 29 formed on the shaping part 71 and hold it firmly until it engages the clamping device on the carrier plate 23 and is clamped by it. Owing to the inclined position of the shaping part and of the feed bars 81, 82 and 83, the bracket 29 fed to the stack conveying device receives the necessary slight inclination of its legs with respect to the vertical.

In order that the clamping device on the carrier plate 23 is precisely aligned with the bracket fed by the feed bars 81, 82 and 83, polyamide guide bars 85 are provided in the bracket delivery station 70 for the sheet metal cover 30 of the clamping device to slide thereon. These guide bars 85 are arranged on a spacer 86 which is mounted on a carrier 87. In order to also support the carrier plate 23 on the side facing away from the shaping part 71 in the bracket delivery station 70, a polymide supporting bar 88 is connected to the spacer 86.

On inserting the bracket held by the magnets 84 on the feed bars 81 and 83 into the clamping device on the carrier plate 23, the legs 31 of the bracket 29 strike the insert surfaces 43 of the angle levers 37, 38 and press them to the side against the force of the springs 44 so that the bracket 29 can be brought with its legs 31 up to the clamping jaw surfaces 35 of the bars 34. In this position, the bracket 29 must be held firmly by the feed bars 81 and 83 until the angle levers 37, 38 are made to fall back into their clamping position by the force of the springs 44. To enable this, recesses 89 (FIG. 4) are provided at the crown of the angle levers 37, 38 and in the bars 34 for the feed bars 82 which interrupt the clamping surfaces 42 and the insert surfaces 43 as well as the clamping jaw surfaces 35 and allow the angle levers 37, 38 to snap into their position in which they clamp the bracket 29. Stop screws 90 provided in the bars 34 for the arms 37 of the angle levers ensure that the insert surfaces 43 function properly.

During operation of the above-described embodiment, the foil web 11' is fed step-wise to the welding station 13. While the foil web is at a standstill, a bag 11 is severed from the foil web by welding and possibly simultaneous cutting and fed to the constantly rotating bladed wheel 19 by the bag conveying device 16 which, as shown in FIG. 2, consists of several conveyor belts. The bag lying on the conveying device 16 is gripped by the suction arms 18, held thereon by suction, and speared onto the legs 31 of a bracket 29 located in the stacking station 14 by engagement of the legs in the stack holes 12 while the bladed wheel rotates. The bladed wheel 17 rotates at such slow speed that the next bag coming from the welding station 13 is gripped by the next arms 18.

The stack conveying device 21 remains at a standstill until the desired number of bags has been stacked in the stacking station. Once the last bag has been deposited on the stack, the stack conveying device 21 moves one step so that when the next bag is brought up by the arms 18 of the bladed wheel, a new empty bracket 29 is standing ready to receive a stack.

While the stack conveying device 21 is at a standstill, in the slip-on station 61, a stack securing disc 62 is slipped onto each leg 31 of the bracket 29 located in the slip-on station 61. In this way, only stacks which are secured by stack securing discs reach the take-off station.

In the take-off station 22, while the stack conveying device 21 is at a standstill, the stack 15 hanging down from the carrier plate 23 is pressed by the conveyor belt against the take-off roll 59. The conveyor belt 53 is driven in the direction of rotation indicated by an arrow on the drive roll 54. Simultaneously with the lifting of the stack 15, the lifting cylinder 52 is actuated, the angle levers 37, 38 are pivoted into their released position so as to release the bracket 29 once the conveyor belt 53 presses the stack against the take-off roll, and the ejector 36*a* is actuated to raise the crosspiece 20 of the bracket 29 above the sheet metal cover 30.

At this instant, the pull of the conveyor belt 53 on the stack 15 becomes effective and pulls it off the stack conveying device.

In the embodiment illustrated in FIGS. 1 to 10, the carrier plate 23 which has been relieved in this way of the stack and hence also of the bracket 29, is inserted during the fifth step of the stack conveying device 21 into the bracket delivery station 70. There, during each conveying stroke of the stack conveying device 21, a bracket 29 is shaped and fed while the stack conveying device 21 is at a standstill to the carrier plate 23 where, as described above, it is clamped by the angle levers 37, 38. During the sixth conveying step of the stack conveying device 21, the carrier plate 23 equipped with the thus clamped bracket 29 is fed to the stacking station 14. Since after each conveying stroke, while the stack conveying device 21 is at a standstill, a new bracket 29 is clamped in the bracket delivery station 70, a new stack 15 is stacked in the stacking station 14, and a stack 15 is taken off in the take-off station 22, the apparatus delivers after each stacking of a stack 15 in the stacking station 14, a stack 15 to the take-off station 22. Accordingly, the output of the inventive apparatus depends only on the speed of the manufacture of the bags in the welding station 13 and on the stacking in the stacking station 14.

FIGS. 11 to 15 show those parts of the second embodiment which differ from the first embodiment. In the following description, all of the parts of the new embodiment which have essentially the same function as the corresponding parts of the first embodiment are designated by a reference numeral which is greater by 100 than the reference numeral of the corresponding part of the first embodiment.

Therefore, reference is made to the description of the first embodiment in order to avoid an unnecessarily lengthy description of the second embodiment.

Essentially, the second embodiment differs from the first embodiment in the design of the transport member 190 and the resulting different design of the bracket delivery station 170 and the take-off station 122.

Figure 12:
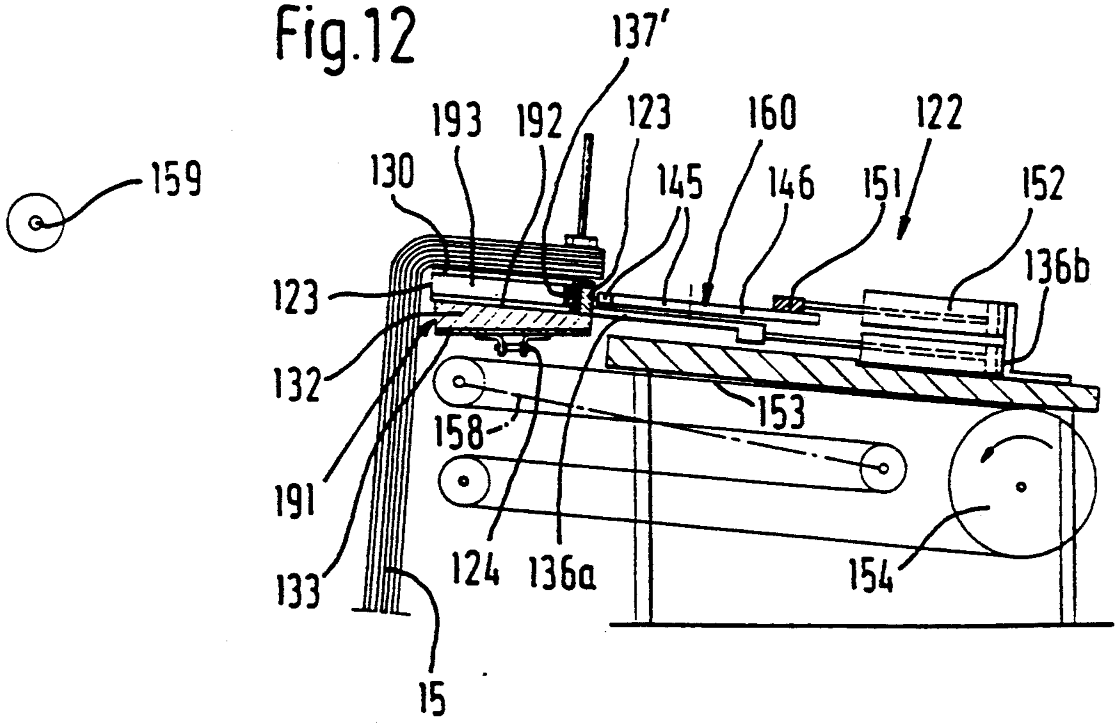
FIG. 12 is a section of the take-off station of the second embodiment along line XII—XII in FIG. 13.
Figure 13:
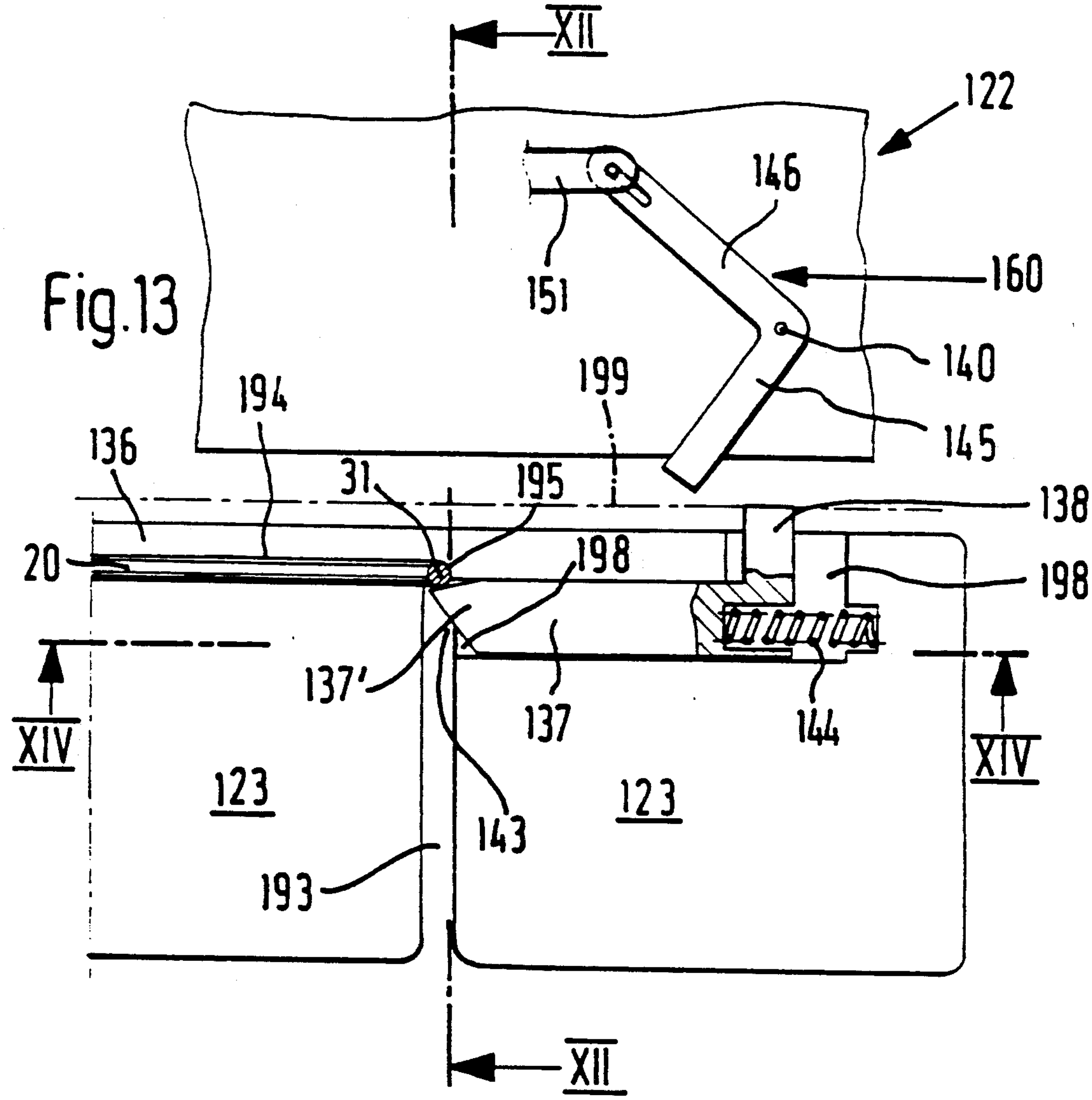
FIG. 13 is a plan view of the take-off station of the second embodiment wherein only the carrier plate of the transport member of the stack conveying device is illustrated.
Figure 14:
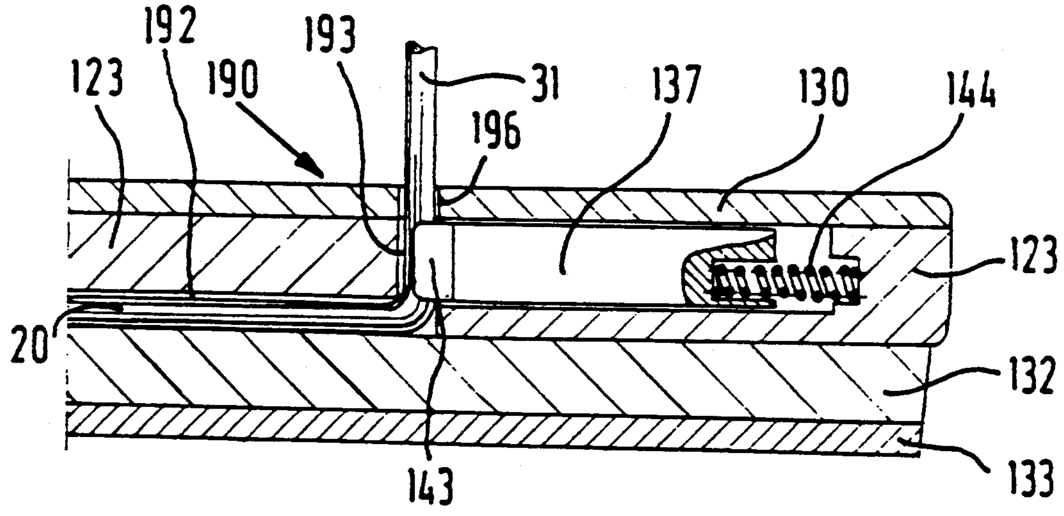
FIG. 14 is a section along line XIV—XIV in FIG. 13.
Figure 15:
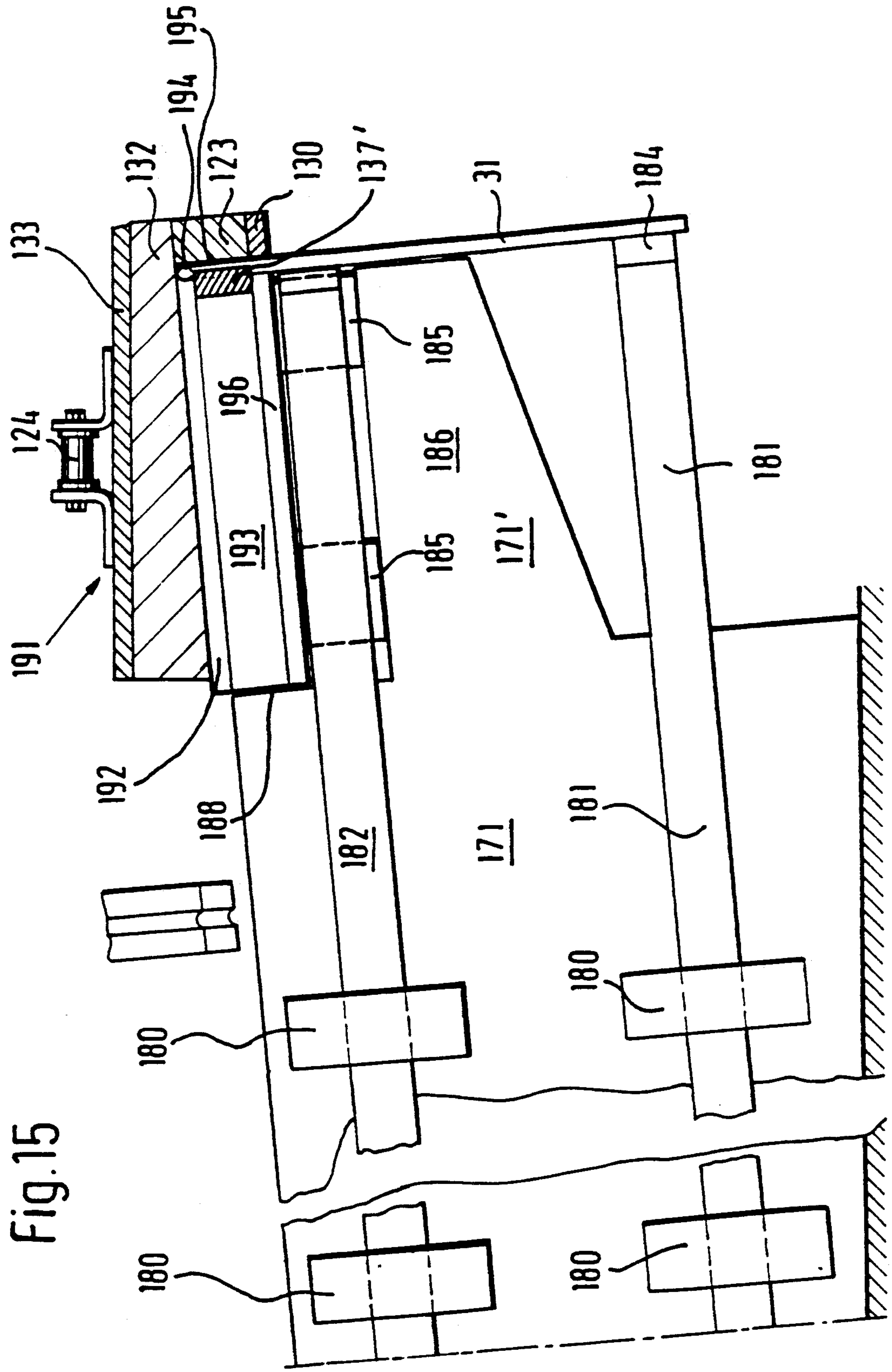
FIG. 15 is a side view in the direction of arrow XV in FIG. 11 of the bracket delivery station of the second embodiment, wherein the transport member of the stack conveying device located in the bracket delivery station is shown in section.

The transport member 191 of the second embodiment is illustrated in a broken-off manner in FIG. 14 as vertical section along line XIV—XIV in FIG. 13 and in FIG. 12 in section along line XII—XII in FIG. 13. A similar vertical section seen in the opposite direction and showing the transport member 191 standing on its head is shown in FIG. 15.

Herein, too, the transport member 191 comprises a base plate 133 which is joined to a link 124 of a roller chain. A wedge-shaped spacer 132 carrying the carrier plate 123 is arranged on the base plate 133. Instead of the sheet metal cover 30, a cover plate 130 is arranged on the carrier plate 123. The main difference herein is that the carrier plate 123 comprises a recess 192 for the crosspiece 20 of a bracket 29 and two recesses 193 substantially perpendicular thereto, and the cover plate 130 comprises recesses 196 which coincide with the recesses 193 and are provided for the parts of the legs 31 of the brackets 29 adjoining the crosspiece 20. The recesses 192, 193 and 196 extend from the bracket delivery station 170 (FIG. 11) almost over the entire width of the carrier plate 123 as far as to abutment surfaces 194 and 195 for the crosspiece 20 and the legs 31. The abutment surfaces 195 for the legs 31 of the brackets 29 extend substantially perpendicularly to the carrier plate 123.

Owing to the wedge-shaped spacer 132, the legs 31 of the brackets 29 are slightly inclined with respect to the vertical, as is shown particularly clearly in FIG. 12.

In this embodiment, angles 137, 138 which are displaceable against the force of springs 144 are provided as releasable holding device for the brackets 29. The angles 137, 138 are arranged in an upwardly open, likewise angle-shaped recess 198 of the carrier plate 123 such that the free end of the one leg 137 of the angle engages the recess 193 and forms a holding jaw 137′ there which holds the adjoining leg 31 of the bracket 29 on the abutment surface 195. The surface 143 of the holding jaw 137′ facing away from the leg 31 extends in relation to the direction of delivery of the bracket 29 at such an incline in the recess 193 that the bracket leg 31 which is to be clamped by the holding jaw 137′ on delivery of the bracket 29 to the bracket delivery station 170, moves the leg 137 of the angle 137, 138 into its released position against the force of the spring 144.

The second leg 138 of the angle 137, 138 protrudes slightly from the carrier plate 123. The leg 138 thereby forms an engagement point for the releasing device 160 provided in the take-off station 122.

The upwardly open recesses 198 for the angles 137, 138 are covered by the cover plate 130 so that the angles 137, 138 are properly guided for displacement parallel to the plane of the base plate 123. The downwardly open recess 192 for the crosspiece 20 of the bracket 29 is closed at the bottom by the spacer 132 so that the recess 192 forms a guiding gap for the crosspiece 20.

In the second embodiment, owing to the arrangement of the recesses 192 and 193 in the carrier plate 123, the bracket 29 can be pushed out together with the stack 15 arranged on it in the take-off station 122 parallel to the plane of the carrier plate 123 and does not have to be raised first, as is required in the first embodiment. The ejector **136*a* driven by the lifting cylinder 136*b* pushes the bracket 29 out of the recesses 192, 193 and 196 in the same direction as that in which the stack is carried away by the conveyor belt 153, which like in the first embodiment, is driven by the drive roll 154 and advanced by the slider 158 (see FIG. 12 in conjunction with FIGS. 6 and 7**).

Figure 11:
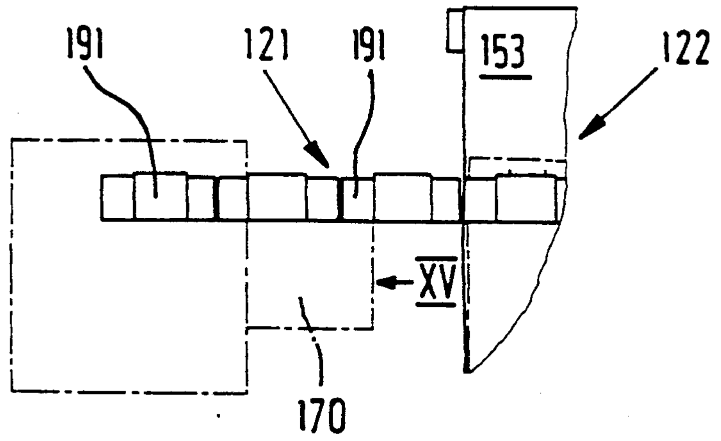
FIG. 11 is a plan view corresponding to FIG. 2 of the bracket delivery station of the second embodiment.

In order to insert the brackets 29 into the recesses 192, 193 and 196 in the bracket delivery station 170, the bracket delivery station 170 in this embodiment must be arranged on the side of the transport members 191 on which the stacks on the transport member hang down from it, as shown in FIGS. 11 and 15. In this embodiment, the shaping part 171 simultaneously forms a platform 171′ which carries the guide bars 185 for the transport members 191. At the same time, the shaping part 171 also forms a guiding surface 188 which replaces the supporting bar 88 of the first embodiment. The transport members 191 are aligned by the guide bars 185 and the guiding surface 188 in the bracket delivery station such that the brackets 29 made on the shaping part 171 as in the first embodiment are inserted into the recesses 192, 193 and 196 of the transport member 191 by two pairs of guide bars 181 and 182 engaging with the permanent magnets 184 the legs 31 of the brackets 29 which are to be inserted until the legs 31 of the bracket 29 are clamped by the holding jaws 137′ on the abutment surfaces 195.

As in the first embodiment, the guide bars 181 and 182 are guided in guides 180 and driven, as shown, for example, in FIG. 10, by a common drive, not illustrated in FIG. 15, for example, by the rack-and-pinion drive 81′ of FIG. 10.

The releasing device 160 is shown in FIGS. 12 and 13. The two angle levers 145, 146 which are mounted at their crown for pivotal motion about the axes 140 are actuated by the lifting cylinder 152 via the connecting link guide 151. In the retracted position of the lifting cylinder 152, the free ends of the arms 145 of the angle levers 145, 146 are in a position outside of the path of motion 199 indicated by a dot-and-dash line in FIG. 13 of the end of the arm 138 of the angle 137, 138 so that the transport member 191 can move into the take-off station 122 unimpeded by the arms 145.

The mode of operation of the second embodiment is essentially the same as that of the first embodiment. In the bracket delivery station 170, the brackets, as shown in FIG. 15, are fed to the transport member 191 from the other side than in the first embodiment.

In the take-off station 122, actuation of the lifting cylinder 152 causes the connecting link guide 151 in FIG. 13 to be moved downwards. The right-hand lever shown in FIG. 13 is thereby pivoted in the counterclockwise direction and the left-hand lever, not illustrated, in the clockwise direction about the axes 140. This results in the arm 145 of the angle lever 145, 146 striking the arm 138 of the angle 137, 138 and pushing it against the force of the spring 144 into a position in which the legs 31 of the bracket 20 are released for removal.

The foregoing description and the drawings relate to the features which are essential to the materialization, by way of example, of the invention. Therefore, insofar as features are disclosed in the description and drawings but are not mentioned in the claims, these serve, if necessary, to also define the subject matter of the invention.

What is claimed is:

1. Apparatus for making and transporting stacks of foil sections comprising:

a stacking station;

a row of interconnected transport members;

a pair of wicketing pins on each transport member on which said foil sections can be placed to form said stacks in said stacking station;

a drive for driving in a step-wise manner the row of transport members to form a stack conveying device, and a take-off station in which said stacks can be taken off said stack conveying device, characterized in that;

(a) a bracket of U-shaped bent configuration is provided to form each pair of wicketing pins, (b) each transport member comprises a releasable holding device for a bracket to hold said bracket in a stacking position in which the legs of said bracket form said wicketing pins, (c) a bracket delivery station in which said brackets are fed by a delivery device to said transport members and gripped there by said holding devices is provided beside said stack conveying device, and (d) releasing device for releasing said holding device is provided in said take-off station.

2. Apparatus as defined in claim 1, characterized in that said stacking station comprises a bladed wheel whose individual blades are formed by at least two suction arms which extend radially from the bladed wheel hub and during rotation of said bladed wheel serve to lift said foil sections fed by a conveying device one after the other off said conveying device and to then place them one on top of the other on said wicketing pins.

3. Apparatus as defined in claims 1 or 2, characterized in that said stacking station follows a welding station in which plastic bags can be manufactured as foil sections which are to be stacked by making welding seams in a plastic web and severing said foil sections from said plastic web.

4. Apparatus as defined in claims 1 or 2, characterized in that a clamping device comprising:

(a) at least one clamping member movable in said transport member against a spring force from the clamping position to a released position, and (b) an actuating member in said releasing device for holding said clamping member in said take-off station in a position in which said bracket is released is provided as the holding device.

5. Apparatus as defined in claim 1, characterized in that said transport member comprises a carrier plate which is inclined in relation to the horizontal plane and is provided with abutment surfaces extending perpendicularly to said carrier plate for said legs of said brackets, said abutment surfaces cooperating with said clamping member to hold said brackets in the stacking position.

6. Apparatus as defined in claim 5, characterized in that said carrier plate is arranged via a wedge-shaped spacer on a base plate which is horizontally aligned at least in said stacking station.

7. Apparatus as defined in claim 6, in that said carrier plate comprises recesses through which a bracket in said bracket delivery station can be pushed until it abuts on said abutment surfaces.

8. Apparatus as in one of claims 5–7, in which two clamping members are provided for abutment on said two legs of said bracket.

9. Apparatus as in one of claims 5–7, in which a spring engaging said clamping member is provided for generating said spring force.

10. Apparatus as in one of claims 5–7, in which said clamping member comprises an insert surface which in relation to the direction of delivery of said bracket in said bracket delivery station extends at such an incline in the path of delivery of said bracket leg that said bracket leg which is to be clamped by said clamping member moves said clamping member into its released position when said bracket is delivered.

11. Apparatus as defined in claim 7, characterized in that:

(a) said transport members are articulatedly connected to one another to form a row revolving endlessly in a vertical plane, (b) said bracket delivery station is associated with the bottom lane of this row, (c) said bracket delivery station comprises a saddle for at least one bracket for feeding said bracket in said bracket delivery station to said holding device in said transport member.

12. Apparatus as defined in claim 11, characterized in that:

(a) said bracket delivery station comprises at least one slider for pushing bracket seated on said saddle into said holding device, and (b) said slider comprises a holding means (84) at its end facing said bracket for holding said bracket when it is transferred from said saddle to said holding device.

13. Apparatus as defined in claim 12, characterized in that said clamping member comprises a recess for said slider to permit motion of said clamping lever into its clamping position without clamping said slider when said slider has moved said bracket into its stacking position.

14. Apparatus as in one of claims 11–13, in which said saddle is designed as a shaping part cooperating with pull bars and a holding-down device for bending a bracket from a piece of wire which is cut from a wire drawn off a supply roll.

15. Apparatus as in one of claims 11–13, in which (a) said slider is formed by several feed bars, (b) said feed bars are fed at least along the two side surfaces of said saddle, and (c) a common drive is provided for all feed bars.

16. Apparatus as defined in claims 12 or 13, characterized in that at least one magnet is provided as holding means for said bracket on the end of said slider that faces said bracket.

17. Apparatus as defined in claims 1, 2, 5, 6, 7, 11, 12, or 13, characterized in that a slip-on station for slipping stack securing discs onto said legs of said brackets is provided between said stacking station and said take-off station beside said stack conveying device.

18. Apparatus as defined in claim 11, characterized in that:

(a) said take-off station is associated with the top lane of said stack conveying device, (b) said take-off station comprises a take-off device, (c) said take-off device is arranged on the side of said stack conveying device that faces away from said bracket in the stacking position, and (d) a lifting device is provided for lifting the part of said stack hanging down from said stack conveying device.

19. Apparatus as defined in claim 18, characterized in that:

(a) a drivable conveyor belt oriented transversely to the conveying direction of said stack conveying device is provided as lifting device, (b) a drive roll drivable about its fixed axis is provided for driving said conveyor belt, (c) three deflection rolls are provided for said conveyor belt, two deflection rolls of which are arranged on a slider which can be moved back and forth and by which the end of said conveyor belt that faces away from said drive roll is movable out of a retracted position below said stack conveying device into an extended position in which said conveyor belt has lifted the part of the stack hanging down from said stack conveying device, and (d) a take-off roll is provided for the stack end which has been lifted by said conveyor belt to be pressed thereagainst in order to pull said stack off said stack conveying device.

20. Apparatus as defined in claims 18 or 19, characterized in that an ejector is provided for pushing said bracket out of said transport member when said holding device is released.

* * * * *

UNITED STATES PATENT AND TRADEMARK OFFICE

CERTIFICATE OF CORRECTION

PATENT NO. : 5,056,202

DATED : October 15, 1991

INVENTOR(S) : Karl H. STIEGLER

It is certified that error appears in the above-identified patent and that said Letters Patent is hereby corrected as shown below:

Claim 1, column 11, line 19, before "releasing" add --a-- (1st. occur.).

Claim 11, column 12, line 7, "claim 7," should be --claim 1,--.

Signed and Sealed this

Second Day of March, 1993

*Attest:*

STEPHEN G. KUNIN

*Attesting Officer*

*Acting Commissioner of Patents and Trademarks*